Feb. 24, 1959  C. M. HAMBLIN  2,874,722
BUOYANT, INSULATED FLEXIBLE TUBING AND METHOD OF MAKING SAME
Filed Oct. 6, 1952  2 Sheets-Sheet 1

INVENTOR
CLYDE M. HAMBLIN
BY
ATTORNEY

Feb. 24, 1959  C. M. HAMBLIN  2,874,722
BUOYANT, INSULATED FLEXIBLE TUBING AND METHOD OF MAKING SAME
Filed Oct. 6, 1952  2 Sheets-Sheet 2
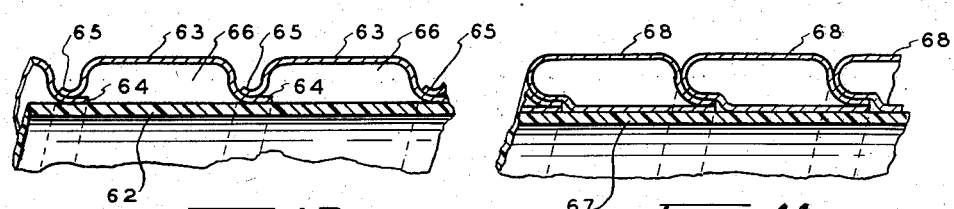
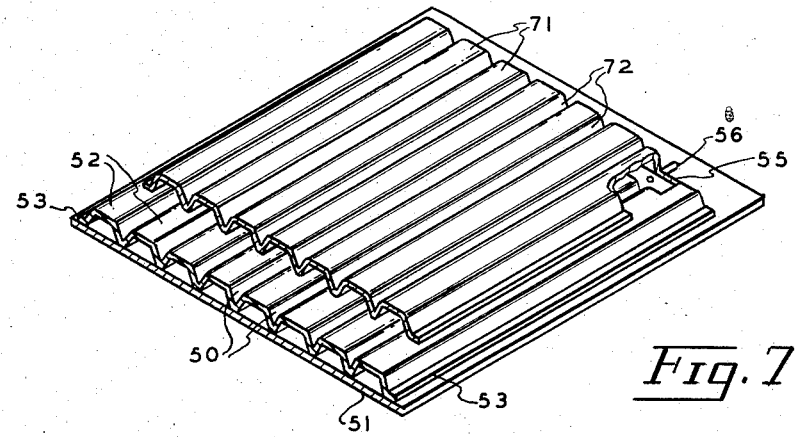
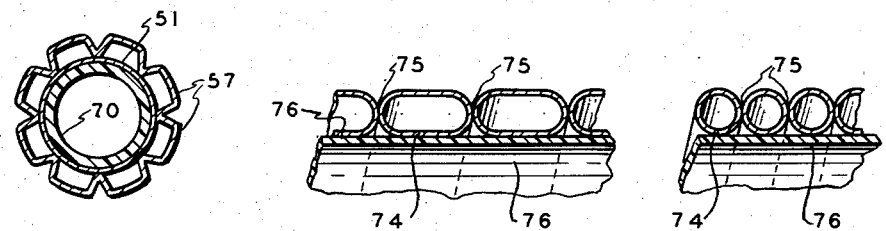
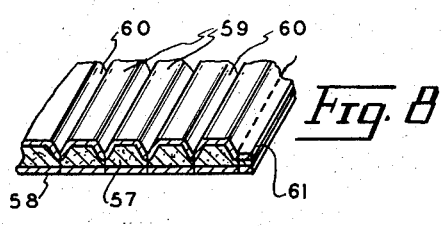
INVENTOR
CLYDE M. HAMBLIN
BY *Tusten Miller*
ATTORNEY ়
United States Patent Office 2,874,722
Patented Feb. 24, 1959

2,874,722

BUOYANT, INSULATED FLEXIBLE TUBING AND METHOD OF MAKING SAME

Clyde M. Hamblin, Washington, D. C., assignor of one-fifth to Eva F. Hamblin, Washington, D. C., one-fifth to Helen H. Livingstone, Arlington, Va., and one-fifth to Barbara H. Marshall, Hyattsville, Md.

Application October 6, 1952, Serial No. 313,339

14 Claims. (Cl. 138—53)

Throughout the description of this invention the term "hose" is used as referring to either duct, hose or tube.

The hose of this invention consists of an inner wall, an outer wall, intermediate walls if desired and space between the walls filled with air or gas by inflation or with insulating material.

A purpose of this construction is to prevent temperature loss or gain through the walls of the hose.

Another purpose is to provide buoyancy for the hose if it is used to convey liquids or other material through or over water, such as fueling-at-sea hose. Such hose having the space between the inner and outer walls inflated with inert gas as a fire prevention measure, may be used for conveying highly inflammable liquids such as gasoline.

The inflatable wall construction has several advantages, one of which is that when the wall is deflated the hose requires very little more stowage space than single wall hose.

Another advantage is that in a hose formed from a helically wound inflatable tube, this tube when inflated serves as a helical air spring to hold the hose extended, both axially and transversely.

Various arrangements of the above described construction are possible. With the foregoing and other objects in view, this invention comprises the combination, construction and arrangement of parts hereinafter set forth, claimed and disclosed in the accompanying drawings, wherein:

Fig. 7 is a perspective view of a one or two layer inflatable tube strip for attachment to a hose.

Fig. 8 is a perspective view of an insulation filled tube strip for attachment to a hose.

Fig. 9 is a section through a hose having a tube strip of this invention attached thereto.

Fig. 10 is a sectional view showing a single tube strip secured about a hose to form a tube thereabout.

Fig. 11 is a sectional view showing a tube preformed from a strip and wound about a hose and secured thereto.

Fig. 12 shows a preformed circular tube wound about and secured to a hose.

Fig. 13 is similar to Fig. 12, with the tube in oval section.

Figure 1:
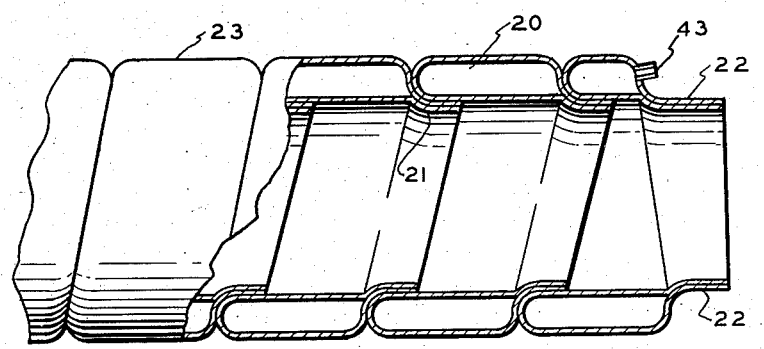
Fig. 1 is a longitudinal sectional view of a portion of one form of hose.

In the construction shown in Fig. 1 an inflatable tube 20 of flexible material is wound helically with a portion of each turn of the tube overlapping a portion of the preceding turn to form a hose having a continuous helical seam 21. Each end of a length of hose may be formed as a cuff 22 for use in connecting hose by means of clamps or couplings. The inflatable tube may be preformed or it may be formed from a flat strip of material as the helical winding progresses. If a preformed tube is used it may be inflated before winding, but both the preformed tube and the progressively formed tube are preferably wound deflated and flat.

Figure 2:
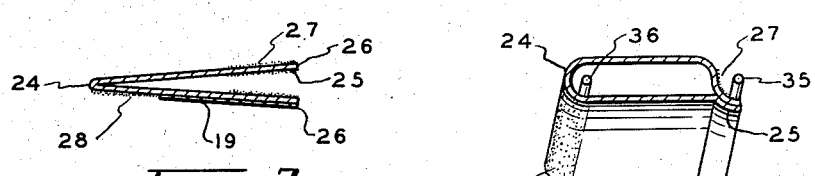
Fig. 2 is a section view across a strip of material ready to be formed into the hose of this invention.

In forming the tube by either method the flat strip of material, 23 in Fig. 2, is preferably folded at mid width 24 and has sealable inner surfaces 25, or surfaces coated with an adhesive, for a distance extending inwardly from edges 26. These inner surfaces 25 are then pressed together to form a continuous pressure tight seam. The upper surface 27 adjacent of one edge 26 of the flattened tube and the under surface 28 adjacent the folded edge 24 are also sealable or coated with an adhesive. The flat tube is then wound helically with edge 24 and the adjacent part of surface 28 lapping edge 26 and the adjacent part of surface 27 of the preceding turn and the helical seam thus formed is allowed to cure before the tube is inflated.

Figure 3:
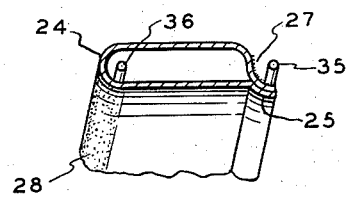
Fig. 3 is a section showing one helix of the tube in inflated form.

Fig. 3 shows the approximate form to which the tube should inflate. To accomplish this with relatively heavy material it may be necessary for at least that portion of the tube extending from the inner edge of area 27 through folded edge 24 to the inner edge of area 28 to be sufficiently elastic to allow for the increased perimeter of the outer wall of the hose when the tube is inflated.

In many cases it may be necessary to have one wall, preferably the inner wall, of the hose non-elastic or less elastic than the other wall and relatively strong. This may be done by reinforcing the strip from which the inflatable tube is formed from edge 26 to area 28 in Figures 2 and 3 with a ply 19 of fabric or an additional ply of the elastic material.

Figure 4:
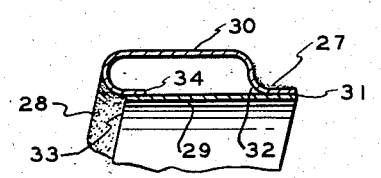
Fig. 4 is a view similar to Fig. 3 of a slightly modified form of this invention.

Another method is to make the tube strip of two parts consisting of a strip of coated or impregnated pressure tight fabric forming the inner strip 29 in Fig. 4 and an elastic pressure tight outer strip 30. The elastic outer strip is secured to the fabric inner strip by having sealable surfaces or adhesive coatings between the edges of the strips from 31 to 32 and from 33 to 34 to form pressure tight seams. Adhesive is then applied at 27 and 28 to the edges of the flattened tube for winding as in the case of Fig. 2.

If desired a wire or cord helically wound may be located as at 35 in Fig. 3 to aid in preventing separation of the seam at 25. To aid in longitudinal extension of the hose a helically wound spring having a free length pitch substantially greater than the pitch of the helical seam in the hose may be used, with the wire preferably located as at either 35 or 36 in Fig. 3.

Figure 5:
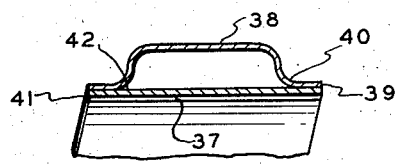
Fig. 5 shows still another modified form of this invention.

Another method for making the inflatable tube for the helically wound hose is shown in Fig. 5 in which 37 is a strip of reinforced flexible material and 38 is a strip of material, preferably elastic, of greater width than strip 37. Sealable surfaces or adhesive coatings are provided from 39 to 40 and 41 to 42 between the edges of strips 37 and 38 to form pressure tight seams. The upper surface of one edge of the tube thus formed and the lower surface of the other edge are sealable or coated with adhesive to form the helical seam in the hose as in the preceding cases.

The increased insulating effect of having the depth of air space between the inner and outer walls of the inflated tube greater than ½ inch is relatively small and this depth is sufficient unless more air space is desired for buoyancy. The necessary percentage of elongation for the elastic outer wall of the tube is therefore relatively small. Increased insulating effect may be obtained by applying a heat reflecting coating such as aluminum paint to the interior surface of the tube. Such coating would be of little benefit on the outer surface, however, as a large percent of the heat emission from the outer surface will be by convection rather than by radiation. It is also generally desirable that the outer surface of the tube be abrasion resistant and the heat reflecting material would not be the best for this purpose.

The length of the helically wound inflatable tube preferably extends from end to end of a length of hose. The ends of the inflatable tube are sealed and a fitting with a valve 43 shown in Fig. 1 is provided at one end of the length of hose for inflating the tube by mouth or by pump. The fitting should be of suitable form and made of or coated with a material of low thermal conductivity so as to prevent the possibility of the lips sticking to the fitting when inflating the tube by mouth in very cold weather.

Another form of the invention is to substitute insulating material, preferably light weight fire resistant type such as fiber glass for the air space between the inner and outer walls of the hose. When insulating material is used the seam or seams between the edges of the inner and outer helically wound strip or strips need not be pressure tight unless it is desired to prevent moisture reaching the insulating material or condensing on the inside surface of the tube when either the inside or outside of the hose is at low temperature.

Figure 6:
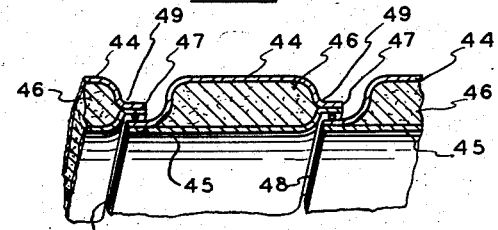
Fig. 6 shows yet another modified form wherein insulating material fills the air space in the tube.

A hose of this construction in which pressure tight seams are not required is shown in Fig. 6 wherein 44 is an outer strip of flexible material which may be elastic if desired, 45 is an inner strip of flexible material preferably reinforced and 46 is light insulating material such as fiber glass. The outer strip 44 is preferably of greater width than inner strip 45 so that the inner wall of the hose formed by the turns of strip 45 will be approximately smooth and the thickness of the hose wall formed by the insulating material will extend outwardly.

In the construction of Fig. 6 a helically wound spring wire 47 is preferably located between the adjacent overlapping edges 48 and 49 of the helically wound strip to prevent transverse collapse of the hose. The spring is preferably wound with a free length pitch substantially greater than the pitch of the seam in the finished hose to hold the axial length of the hose normally extended. If desired the spring 47 may be wound with a free length pitch less than the pitch of the seam in the finished hose to hold the hose normally contracted or the spring may be wound with the same pitch as that of the seam in the finished hose.

In this hose additional insulating effect is obtained by extending insulating material 46 to edges 48 and 49, then making the helical seam and inclosing the wire 47 by stitching through the strips and insulating material, preferably by means of a two needle sewing machine. However, the invention is not limited to this method as metal stitching and other devices for securing the edges may be employed.

Other forms of the multiple wall hose of the invention are shown in Figs. 7, 8 and 9 in which the seams 50 forming the inflatable air tubes or holding insulating material in place extend axially of the hose. Prefabricated inner and outer tubes as in Fig. 7 may be used to make this hose and the axial seams made to connect these prefabricated tubes but the preferred method is to lay out the sheet material for the inner and outer walls of the hose flat and have strips of sealable material or adhesive material on the surfaces where the axial seams are to be located, if air tube construction is to be used. The sheets for the inner and outer walls are then placed face to face with the adhesive strips matching to form the pressure tight seams.

If insulating material is to be used as in Fig. 8 and to extend through the seams the adhesive or sealable strips will not be required and stitched seams may be substituted. For the axial seam type of construction the material of the inner and outer walls should be flexible but need not be elastic. A suitable fabric, preferably coated with rubber or plastic, is best for the purpose. In order that the hose will have an approximately smooth inside wall, the sheet of material for the outer wall should be wider than that for the inner wall and the space between the seams for the outer wall greater so that the bulge caused by inflation of the tube or by the insulating material will extend outwardly.

After the seams have been made in the flat sheets, and insulating material is used, the longitudinal edges of the completed wall structure are lapped one on the other and the axial seam made with an adhesive or by stitching to form the hose tube. Fig. 7 is a perspective view of the superimposed sheets of material showing the lines of axial seams 50. In Fig. 7, 51 is the sheet of material for the inner wall of the hose, 52 is the wider sheet with wider spaced strips of adhesive for the outer wall of the hose, 53—53 are the longitudinal edges of the sheets of material and 50—50 are the axial seams formed by the adhesive on the contacting surfaces of the sheets to form the pressure tight inflatable axial tubes. These tubes may be individually inflated through an individual fitting with valve in one end of each tube, but the preferable method is to have the axial tubes open to each other at one end as shown at 55 in Fig. 7 and use a single inflating fitting 56 at this end.

Additional insulating effect may be obtained by adding a third sheet 71, of approximately the same width as sheet 52, to the structure just described with pressure tight seams 72 located between seams 50. This arrangement gives a second tier of inflatable tubes which materially increases the insulating effect of the structure.

Fig. 8 shows a construction generally similar to sheet 52 on hose 51. In Fig. 8 insulation 57 is placed between inner sheet 58 and outer tube sheet 59 and axial seams 60 are then stitched.

Fig. 9 shows the flat sheets of Fig. 7 and Fig. 8 rolled to form the hose tube with sheet edges 53 or 61 secured together by an adhesive or by stitching.

The various constructions described above are applicable to complete hose of light wall design for relatively low pressures. Generally similar constructions may be applied for insulation or buoyancy, on the outside of hose used for high and low pressures. One form of such construction is shown in a longitudinal sectional view Fig. 10 of a hose in which 62 is the hose wall, 63 is a helically wound strip, of pressure tight material, which may be elastic if desired, having adjacent edges 64—65 overlapped and secured together and to the outer surface of the hose wall 62 by an adhesive to form a pressure tight seam extending from end to end of a length of hose. The space 66 between the hose wall 62 and strip 63 then forms a pressure tight helical tube which is sealed at each end of the length of hose and a fitting as described for Fig. 1 provided for inflating the tube.

Another method of forming an inflatable helical tube about a hose wall is to preform a tube of one of the types shown in Figs. 3, 4 or 5 and wind it helically on hose wall 67 in Fig. 11 as shown by 68 with the tube secured to the outer surface of hose wall 67 and overlapping edges secured together with an adhesive. If pressure tightness of the tube is not necessary and insulation is substituted the insulated tube of Fig. 6 may be preformed and stitched and then wound helically on the hose with the strip secured to the hose wall and edges secured together with an adhesive. In these constructions spring wires 35, 36 or 47 are not necessary.

Another method for providing an inflatable tube on the outside of a hose is to preform the tube by extrusion or other method and wind it helically about the hose with the turns of the tube so spaced as to give the sectional form shown in Fig. 3, or the circular section in Fig. 12 or oval section shown in Fig. 13, when inflated. The walls of each turn of the tube in Fig. 3 are secured to the adjacent turn and to the hose wall as described for Fig. 11. The walls of each turn of the tube in Figs. 12 and 13 are secured to the adjacent turn at 75 and to hose wall 76 at 74 in Figs. 12 and 13 by an adhesive.

The hose 62, 67, 70 and 76 may be the conventional thick wall type or it may be a thin wall hose formed from coated fabric with either longitudinal or helical seam.

The axial seam type inflatable or insulated construction shown in Fig. 7 and Fig. 8 may also be applied to high pressure hose by wrapping the preformed flat sheets about the hose as shown in Fig. 9 in which 70 is the hose wall, 51 or 58 the inner sheet, 52 or 59 the outer sheet and 57 the inflatable tube or insulation. This buoyant or insulated construction is wrapped around the hose and preferably secured to the hose wall outer surface and the edges 53 or 61 secured together by an adhesive. However, if desired the inflatable or insulated structure may be made removable by wrapping the structure around the hose and securing the edges together by lacing, by snaps or hooks or by any other suitable method. Such removable feature may be desirable for fire hose on which the structure could be used in very cold weather to prevent the water freezing and be removed in warm weather. Another desirable feature for fire hose is a coating of low heat conductivity material or an insulating jacket on the hose nozzle.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. An insulated hose wall comprising a tube with parallel walls of flexible material with sealable edges and insulating material between said walls, said tube being wound helically with said sealable edges of each turn of said tube lapping the adjacent sealable edges of adjacent turns to secure said edges together and form a continuous helical seam.

2. A hose wall as claimed in claim 1 in which a helically wound wire is positioned between the lapped edges of the helically wound tube.

3. An insulated hose wall comprising two strips of flexible material, one superimposed on the other with insulating material positioned therebetween, said strips and insulating material being wound helically with the edges of the superimposed strips of each turn lapping the adjacent edges of adjacent turns of said strips to form a continuous helical seam, and means for securing said edges together.

4. A hose wall as claimed in claim 3 in which the outer strip of the parallel and superimposed strips is wider than the inner strip to allow the insulation filled wall to extend outwardly and give a substantially smooth inner wall.

5. A hose wall as claimed in claim 4 in which the lapped edges of the strips are stitched to form the helical seam.

6. A hose wall as claimed in claim 5 in which a helically wound wire is positioned between the lapped edges of the strips of flexible material.

7. A hose wall as claimed in claim 6 in which the helical seam is formed by stitching on both sides of the helically wound wire.

8. A hose wall as claimed in claim 6 in which supplementary means is used to secure the helically wound wire in the helical seam of the hose wall.

9. A hose wall as claimed in claim 8 in which the helically wound wire is spring wire under stress.

10. An inflatable hose wall comprising a tube formed of a strip of non-porous flexible non-elastic material with sealable edges and a strip of non-porous flexible elastic material with sealable edges joined to said sealable edges of said non-elastic strip, said tube being wound helically upon itself with said non-elastic strip forming the inner wall and said sealable edges of each turn of said tube lapping the adjacent sealable edges of adjacent turns of said tube to secure said edges together and form a continuous helical seam.

11. An inflatable hose wall comprising at least one tube consisting of a longitudinal strip of non-porous flexible material folded along its longitudinal center line and having sealing adhesive coated along both opposite sides a distance inwardly of both opposite longitudinal edges, the inner adhesive coated sides being joined and providing a tube, the tube being wound helically upon itself with said outer adhesive sides joined in a continuous helical seam and providing a hose wall.

12. A hose comprising a tube formed of at least one strip of flexible material, said tube being wound helically with inner and outer walls of said tube in spaced relation and having adjacent edges of successive turns of said tube in overlapping relation with one another, and means securing said overlapped edges together.

13. A hose comprising an inflatable tube formed of at least one strip of non-porous, flexible material with sealable edges, said sealable edges being joined to form a tube, said tube having a sealable edge and being wound helically upon itself with said sealable edge overlapping a tube wall to form a hose with a sealed helical seam.

14. The method of constructing an inflatable hose wall consisting of coating with an adhesive sealing material one side of a strip of non-porous flexible material for a distance inward from both edges of said strip, folding said strip preferably along its longitudinal center line to bring said adhesive coated edges together and form a continuous longitudinal seam and a continuous tube, then coating with an adhesive sealing material one side of said folded strip for a distance inward from the joined edges of said folded strip and the other side for a distance inward from the folded edge of said strip, and winding said folded strip helically upon itself with the adhesive coated edges of each turn lapping the adjacent adhesive coated edges of adjacent turns of said folded strip to secure said edges together and form a continuous helical seam.

References Cited in the file of this patent

UNITED STATES PATENTS

| | | |
|---|---|---|
| 2,322,937 | Halthouse | June 29, 1943 |
| 2,572,062 | Sexton | Oct. 23, 1951 |
| 2,630,157 | Smellie | Mar. 3, 1953 |

FOREIGN PATENTS

| | | |
|---|---|---|
| 721,430 | France | Dec. 22, 1931 |
| 969,566 | France | May 24, 1950 |